Nov. 11, 1952 A. ROSE 2,617,876

SYSTEM FOR COLOR TELEVISION

Filed Dec. 17, 1949 3 Sheets-Sheet 1

INVENTOR
Albert Rose
BY
[signature]
ATTORNEY

SYSTEM FOR COLOR TELEVISION

Filed Dec. 17, 1949 3 Sheets-Sheet 2

INVENTOR
Albert Rose
BY
ATTORNEY

Nov. 11, 1952

A. ROSE 2,617,876

SYSTEM FOR COLOR TELEVISION

Filed Dec. 17, 1949

3 Sheets-Sheet 3

INVENTOR
Albert Rose
BY [signature]
ATTORNEY

Patented Nov. 11, 1952 2,617,876

UNITED STATES PATENT OFFICE 2,617,876

SYSTEM FOR COLOR TELEVISION

Albert Rose, Princeton, N. J., assignor to Radio Corporation of America, a corporation of Delaware Application December 17, 1949, Serial No. 133,509

9 Claims. (Cl. 178—5.4)

This invention relates to electronic apparatus for simplifying and improving the reproduction of colored images.

In certain embodiments the invention is useful in reproducing colored images in response to video signals that give simultaneous information as to the intensities of the various component colors that may be employed, and in other embodiments the invention is useful in reproducing images in response to video signals that sequentially represent the intensities of the component colors. In all embodiments, the image is directly reproduced in color by light producing materials such, for example, as phosphors mounted upon or having the effect of producing a single viewing surface.

Colored images have been reproduced in both simultaneous and sequential systems by forming separate partial images each of which represents the intensity variation of a single component color and superimposing them by optical means onto a single viewing screen.

When field or frame sequential color systems have been employed, the partial images may be formed on a single cathode ray tube and color selection obtained by mechanically inserting optical light filters between the surface of the tube and the viewer. If, however, the rate of change of color information is faster than a field or frame rate—elemental or line to line, for example, it becomes extremely difficult to devise a satisfactory mechanism for interposing the color selective optical filters. Furthermore, when large images are to be formed, the mechanism for filter insertion is often cumbersome.

In this invention, however, the need for separate kinescopes and an optical system for superimposing their images or the need for a mechanism for inserting optical filters is obviated whether the signals are simultaneous or sequential. This means that the complexity of a color television receiver can be greatly reduced and that present monochrome receivers can be adapted to reproduce colored images with a minimum expense.

One object of this inveintion is to provide a novel and simplified system that is capable of reproducing images in color in response to video signals that sequentially represent the intensity variations of different component colors in which phosphors, producing light of different and corresponding component colors, may be viewed on a single surface.

A further object of the present invention is to provide electronic apparatus functioning as a system to selectively control a cathode ray tube in a novel mannner.

A further object of this invention is to provide a simplified system capable of reproducing images in color from video signals that simultaneously represent the intensity variations of the different component colors in which different color responsive phosphors may be viewed on a different surface.

These and other objects of the invention will become apparent from a detailed consideration of the figures in which.

Although certain aspects of the invention will be explained in detail in combination with a dot multiplex color television system, the broad aspects of the invention may be equally adapted to a simultaneous color television system. In the dot multiplex sequential system, video signals sequentially represent the intensities of the component colors and the color information reproduced at any instant of time represents an element of the reproduced image.

Figures 1, 1A:
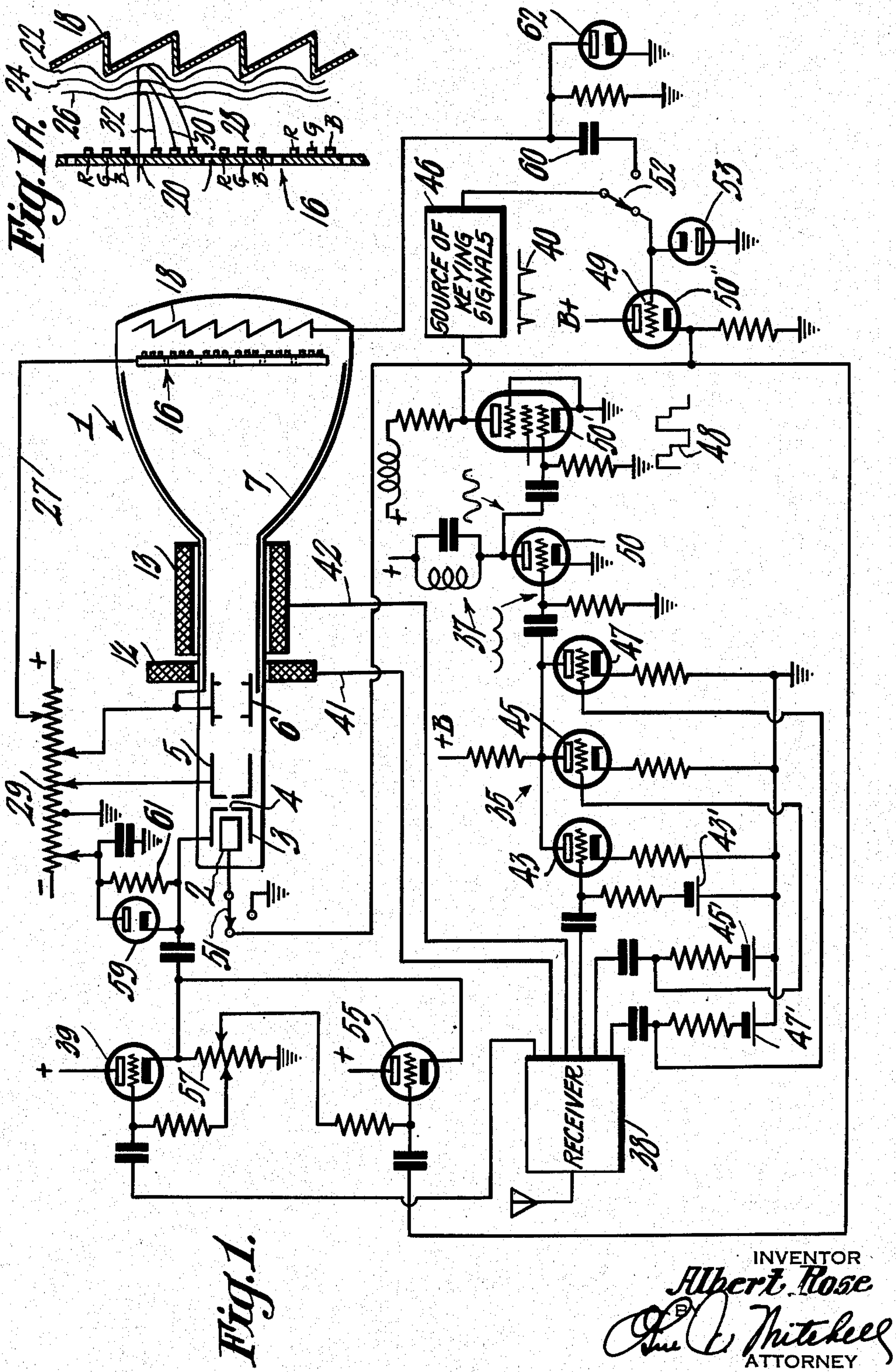
Figure 1 is a schematic showing of a system embodying the invention for reproducing colored images from sequentially derived colored images.
Figure 1A is a large scale view of the target and electron mirror structure of the cathode ray tube included in Figure 1.

The cathode ray tube 1, an embodiment of which is shown in Figure 1 and Figure 1A forms an important component in a combination that embodies the principles of this invention. It is, or may be, comprised of the following standard structure, namely, an evacuated envelope which may be formed with a neck portion and a conical bulb portion as shown, an electron gun structure which may be comprised of a cathode 2, a control grid 3 that is cylindrical in form, the cylinder being closed at one end by an apertured grid plate 4, and axially spaced tubular electrodes 5 and 6. During normal tube operation, control electrode 3 is operated at some potential negative with respect to the potential of the cathode 2, while electrode 5 is maintained at a positive potential of several hundred volts relative to the cathode potential and electrode 6 is maintained at several thousand volts positive to provide a high acceleration of the electron beam. The electrodes 3, 5 and 6, together with the cathode electrode 2 constitute an electron gun structure in which the electron emission from the cathode is formed into an electron beam. In the tube shown in Figure 1 incoming signals are applied to the negative control electrode 3 so as to modulate the density of emission of the cathode in accordance with the signals. The wall coating 7 that is deposited on the inner surface of the conical section and extended part way into the tubular section of the envelope is supplied with the same potential as electrode 6.

The novel features of the cathode ray tube are the target 16 and the means 18 for reflecting electrons that pass through apertures in the target back to phosphors that lie on the target surface. This last-named surface, including the phosphors thereon, effectively emits light which is transmitted exteriorly of the tube. In this way, a luminous image in color is provided. The target 16, in this particular arrangement, is made of material having the property of electrical conductivity and has a series of apertures 20 which may be in the form of slits that extend substantially parallel to one direction, for example, the horizontal direction of scansion of the electron beam. In between each of the apertures 20 and on the side of the target 16 remote from the beam projecting means, groups of different color responsive phosphors are mounted in parallel strips.

The electron mirror 18 is illustrated to an enlarged scale in Figure 1A. It is comprised of light transmitting material having the property of electrical conductivity. Ideally, it is transparent. This mirror 18 may be constructed of fine wire mesh. The surface nearer the target 16 of the light transmitting and electrically conductive electron mirror in the tube 1, however it may be made up of suitable material, is shaped like a series of sawteeth with the center portion of the sloping face of each sawtooth approximately opposite one of the apertures 20. In this particular embodiment, equipotential lines, such as those indicated by the lines 22, 24 and 26, all slope in approximately the same direction in the region opposite each of the apertures 20. The difference in slope is not essential to this invention and is merely inherent in the form. It will be apparent to those skilled in the art that the invention is fully operable where the configuration of the mirror is such as to make the equipotential line parallel. The target 16 is held at a relatively positive potential with respect to the electron mirror 18 by a connection 27 to a potentiometer 29, and therefore electrons passing through the apertures 20 toward the electron mirror 18 will be reflected to one of the phosphors. The particular phosphor which is struck will depend upon the penetration of the electrons into the field between the target 16 and electron mirror 18. For example, if the electrons are permitted by field strength to penetrate to a point represented for purposes of this description by equipotential line 22, they will be reflected along a trajectory such as that indicated by numeral 28 to the blue phosphor, and if they penetrate only as far as the equipotential line 24, they will be reflected along trajectory 30 to the green phosphor. Similarly, if they only reach equipotential line 26, they will be reflected along trajectory 32 to the red phosphor. In other words, the irregularly shaped electron mirror 18 provides an electrostatic lens opposite each of the apertures 20 which controls the landing point of the beam on the target 16 in accordance with the penetration of the beam.

The operation of the special cathode ray tube 1 will now be discussed in combination with a color television system of the dot multiplexed type such as described in the publication "A Fifteen- by Twenty-Inch Receiver for RCA Color Television System" published in October 1949 and made available to the Federal Communications Commission on October 20, 1949. To obtain operation of the tube 1 to provide color images the means for selectively controlling this tube to be described hereinafter as part of the present invention is incorporated in the illustrative setting of the system of the publication. In that system video signals that sequentially represent the intensities of three component colors are provided by a receiver such as the receiver 38. In the embodiment of the Figure 1, these signals from the receiver 38 are applied to the grid 3 of the cathode ray tube 1 via a cathode follower 39 of a type well known to those skilled in the art. The rate of change from one color to another was chosen, in that particular arrangement of the publication, as 11.4 megacycles, the rate of occurrence of any single color therefore being at a rate of 3.8 megacycles. The receiver 38 also supplies focusing and deflection voltages via leads 41 and 42 respectively to the focusing coil 12 and the yoke 13 in a manner well known to those skilled in the art.

The variations in penetration of the electron beam into the retarding electrostatic field between the target 16 and the mirror 18 that is required for color selection as discussed briefly heretofore in connection with Figure 1A, and to be described more in detail hereinafter, may be obtained by making the velocity of the beam different for each color. The apparatus of Figure 1 is operable to vary the control voltage applied to the electron mirror 18 and it may also operate by varying a control voltage which is applied to the cathode 2. Operation, either by cathode control or electron mirror control, is conveniently obtained by manipulation of switches 51 and 52. More in detail, beam velocity change may be accomplished by modulating the cathode 2 with a voltage wave form that changes amplitude at the same rate as the color information. For example, when the receiver 38 is similar to that shown in Figure 9 of the above publication as pointed out above, 3.8 megacycle voltage waves that are 120 degrees out of phase with each other are derived in the receiver 38. These 120-degree phase displaced voltage waves are supplied to the grids of three amplifiers 43, 45 and 47 operated class "C" by suitable biasing means such, for example, as bias batteries 43', 45' and 47'. The plates of these three amplifiers are tied to a suitable positive potential source B+ (not shown) through a common load impedance. The amplifiers 43, 45 and 47 comprise an adder, designated generally by reference character 35, which adds portions of the 120-degree phase displaced waves which are passed by the class "C" amplifiers. The voltage waves present at the plates of these amplifiers have maximum negative peaks occurring at the rate of 11.4 megacycles and are fed to an amplifier 50 which has a parallel resonant circuit 37 tuned to 11.4 megacycles connected to its plate. The 11.4 megacycle sine wave thus derived from 37 is supplied to a driver amplifier 50' via an R. C. coupling network that biases this tube so that only negative pulses 40 appear at its plate. These negative pulses are applied to a source of keying signals 46, the details of which will be discussed in connection with Figures 3, 3A and 3B. As will be seen, the source 46 is capable of providing a stepped waveform 48 which varies from one amplitude level to another at the rate of 11.4 megacycles.

When the switches 51 and 52 are in the position shown, the stepped waveform 48 is applied to the grid 49 of a cathode follower tube 50, the grid 49 being clamped to ground potential by a diode 53 connected as shown. The cathode of the cathode follower tube 50 is connected to the cathode 2 of the cathode ray tube 1 and also is coupled to the grid 3 of the cathode ray tube 1 via a cathode follower 55, the cathode load 57 of which is the same as that for cathode follower 39. In order that the stepped waveform thus applied to the grid 3 and the video signals may be clamped to a suitable negative bias, diode 59 and resistor 61 are connected in parallel between the grid and a negative point on the potentiometer 29. In this way, the potential difference between the grid and the cathode does not vary with the application of the stepped waveform 48 and intensity modulation of the beam in accordance with this waveform is therefore avoided. In order to obtain the 50 or 60 volt range normally required to drive a kinescope resistor 57 must be fairly large if the tubes 39 and 55 are not to draw excessive plate current. If the grids resistors were returned to ground potential, the tubes 39 and 55 would therefore be biased too heavily. For this reason, the grid resistors are returned to adjustable intermediate points on resistor 57.

When the switches 51 and 52 are in the opposite position from that shown in Figure 1 the stepped voltage waveform 48 is applied to the electron mirror 18 via coupling condenser 60 and is clamped to ground potential by a diode 62. When the retarding field between the mirror 18 and the target 16 is made greater by the application of this waveform, the electrons tend to follow the trajectory 32 of Figure 1A, and as the field is reduced, the electrons penetrate nearer to the electron mirror and are therefore reflected along trajectories 30 and 28 respectively. This method is considered to be preferable in tubes in which the capacity between the electron mirror 18 and the target 16 is so small as not to require a large power output from the source of keying signals 46.

Figures 3, 3A, 3B:
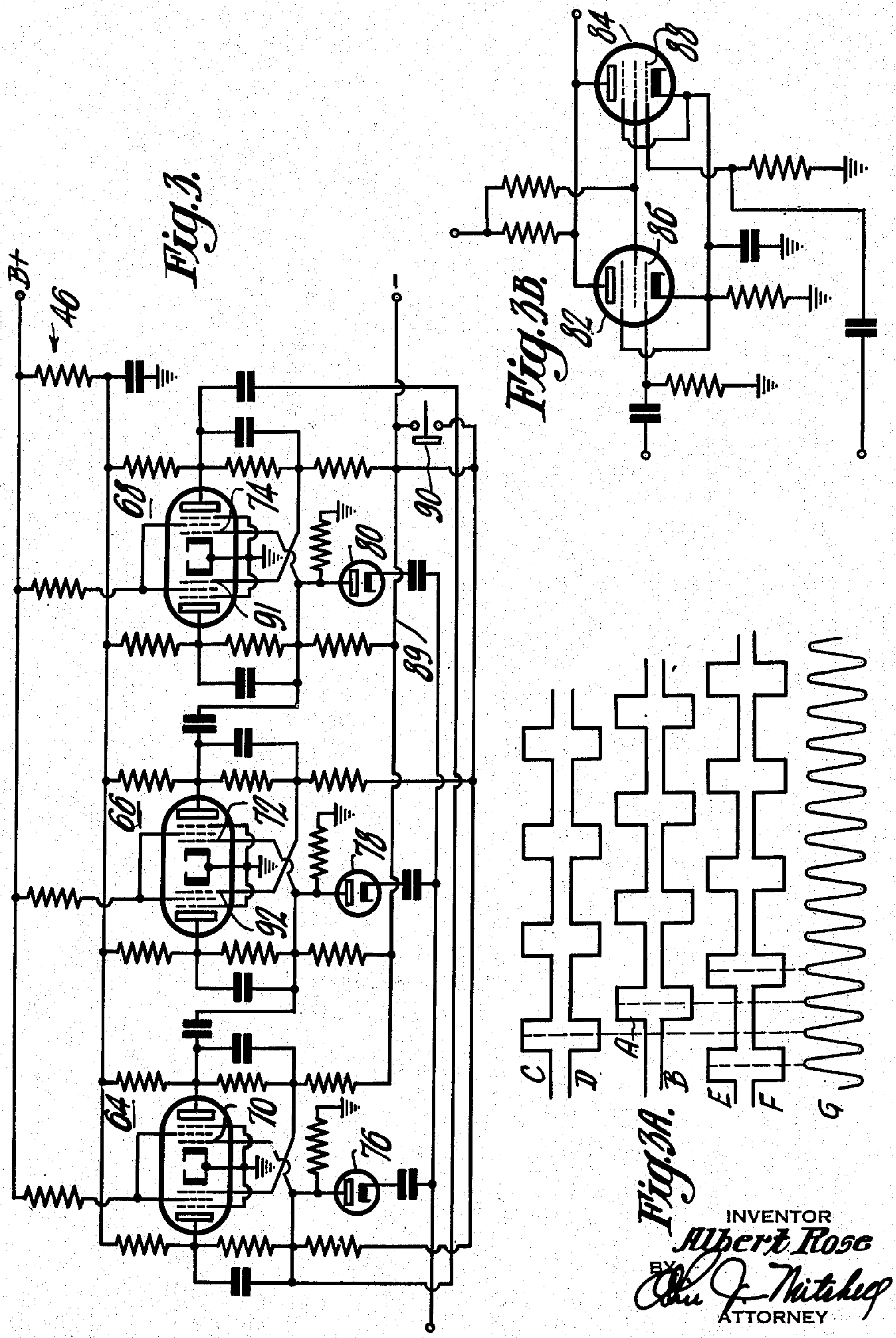
Figure 3 illustrates the ring multivibrator circuit which may be employed to develop the derived tube control or keying voltage waves.
Figure 3A illustrates the waveforms that occur in various points in the circuit of Figure 3.
Figure 3B illustrates an adding circuit that combines certain of the available outputs of the circuit shown in Figure 3 so as to provide a proper keying voltage wave.

The details of the source of keying signals 46 illustrated in Figures 3, 3A and 3B may be as follows: Three bistable multivibrators 64, 66 and 68 are connected in a ring, as illustrated in Figure 3. The details of these multivibrators need not be explained, as they are well known in the art, but the operation of them in this particular embodiment is as follows: Assume that the right hand tube of the multivibrator 64 is conducting and that the right hand tube of the multivibrators 66 and 68 are not conducting. This means that the grid 70 is positive and that the grids 72 and 74 are negative. The drive voltage indicated by the wave G of Figure 3A may be derived at the output of driver 50', as explained in connection with Figure 1 and when applied to the diodes 76, 78 and 80 via isolating condenser only the negative portion of the waves is simultaneously applied to the grids 70, 72 and 74 at a rate of 11.4 megacycles. Inasmuch as the grids 72 and 74 are already negative enough to cut off their respective tubes, the application of the negative drive voltage has no effect on their associated multivibrators. However, the application of the negative drive voltage to the grid 70 causes the multivibrator 64 to flip over to its other stable condition and to provide a positive pulse to the grid 72 of the multivibrator 66. The grid 70 is now negative and multivibrator 66 is the only one of the ring which will be operated on the next negative drive pulse because its grid 72 is now positive.

The waveforms A through F thus derived at the plates A through F of the tubes of the multivibrators 64, 66 and 68 are indicated in Figure 3A, and if the waveforms available at plates D and E are added, the desired wave shape 48 shown in Figure 1 is obtained. An adder that may be used for accomplishing this operation is shown in Figure 3B and includes two pentodes 82 and 84, the plates of which are tied to B+ via common plate load resistor and the cathodes of which are tied to ground via a common parallel R. C. network. If waveform D is applied to the grid 86 of pentode 82, and waveform E is applied to the grid 88 of pentode 84, the wave form 48 is produced at the plates.

Various methods may be provided to insure that the waveform 48 provided by the circuits of Figures 3 and 3B are in phase with the transmitted information, but this can easily be accomplished by applying negative bias by the lead 89 to the grids 74 and 72, and by supplying this same negative bias via the push button 90 (Figure 3) to the grids 91, 92 and 70. In normal operations, the push button is closed and the control grids of all the tubes in the three multivibrators receive the same negative bias. However, when it is desirable to change the phase of the stepped voltage wave 48 the push button 90 is opened. In this way, the right hand tubes of the multivibrators 66 and 68 have a negative bias on the grids 72 and 74, whereas on the right hand tube of multivibrator 64 has a positive bias on its grid 70. If then, the push button is released at the proper time, the waveform 48 will be in proper phase relationship with the video signals.

More detailed reference will now be made to the operation of the special tube 1 in connection with Figures 1 and 1A. Whereas the apertures and their associated phosphors, described in connection with Figure 1, are substantially parallel to the horizontal scanning of the target, it is contemplated that they can be arranged in any direction or may be curved.

An order of magnitude relationship between the voltages employed in the tube, such as has been described in connection with Figures 1 and 1A and the dimensions is given by the following formula:

$$\Delta V=\left(\frac{W}{L}\right)1/2-\frac{V}{L}\Delta D$$

wherein voltages are given in volts and distances in centimeters and in which:

$\Delta V$=color switching voltage
$W$=dimension of sawtooth or roughness
$L$=distance from apertured screen to reflector
$V$=beam voltage
$\Delta D$=deflection distance of the beam from color to color The dimensions of the apertures and phosphors is determined partly by their arrangement and partly by the amount of color resolution that may be permitted. Where they are not parallel to the horizontal scansion of the beam the situation arises where the area of the apertures lying within the beam spot is not constant as the beam proceeds across the target, and this may produce changes in intensity. Therefore, it is preferable to make the spacing between the apertures less than the spot size of the beam.

Aside from reducing any intensity variation that may be present, this reduction in the spacing between apertures interlaces the colors in a finer pattern so that the viewer may approach closer to the screen without being able to resolve the different colors and is especially advantageous on large screens.

Figure 2:
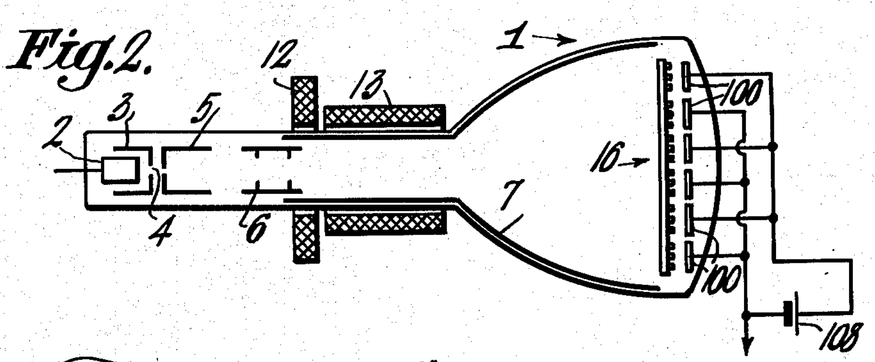
Figure 2 illustrates a tube having different type of target and electron mirror structure.
Figure 2A:
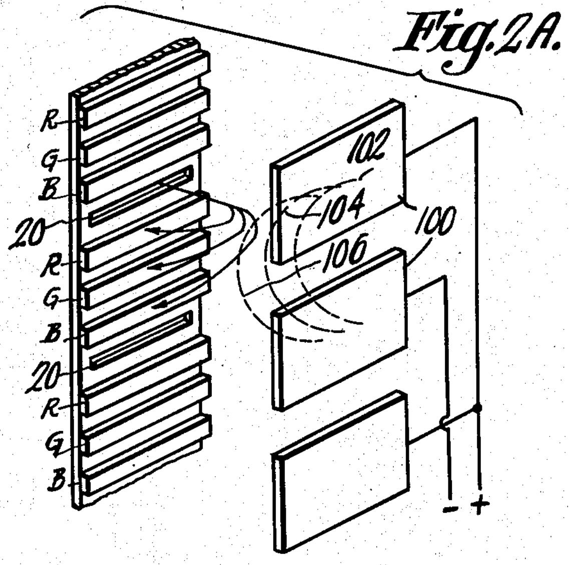
Figure 2A illustrates the target structure of Figure 2 in greater detail.

Unless proper provisions are made, the beam will approach the target 16 of Figure 1 at different angles as it scans the raster and thus the relative spacing of the points of return with respect to the apertures 20 through which the beam entered the retarding field between the target 16 and the electron mirror 18 will vary. One way of insuring the normal approach of the beam to the target 6 is to make the positive potential of the target 16 on-and-one-half to two times the positive potential applied to wall coating 7. Another way of accomplishing this desired result is to curve the target 16 and the electron mirror 18 so that all points on either one are substantially the same distance from the center of deflection. In this way, the beam approaches along a radius. The relative spacing of the phosphors can be changed so that they are at the proper landing points. Then too, the slope of the sawteeth can be altered so as to change the angle of the retarding electrostatic field into which the beam is projected. In the arrangement of Figures 2 and 2A the relative potentials of the strips 100 can be suitably altered to take care of differences in angle of approach caused by vertical deflection. The strips could be divided up in a horizontal direction and different potentials applied between successive pairs as the sides of the target are approached so as to take care of differences in angle of beam approach produced by horizontal deflection.

In the illustrated embodiments of the invention the reflected beam strikes the phosphors adjacent to the aperture through which it originally passed, but this is not necessarily the case as the phosphors may be separated from the aperture through which the beam passes originally by any desired distance with any number of apertures and groups of phosphors therebetween. In an extreme case, the phosphors could be located so that the beam does not pass between groups of phosphors but passes through apertures which are all to one side of the phosphor groups before being reflected back toward one phosphor of a group. However, good results may be obtained when the distance between the point of entry into the field and the point of return of the reflected beam to the phosphors is in the neighborhood of 25 times the distance between adjacent apertures.

The electron mirror may be constructed in different ways. For example, as shown in Figures 2 and 2A, it may be comprised of a series of transparent current conducting plates that are located opposite each of the groups of phosphors. As an alternative to this construction, the plates 100 may be replaced by wires, but in either case, alternate plates or alternate wires are connected to relatively positive and negative sources of fixed potential. The dotted lines 102, 104 and 106 represent the type of electrostatic field that is created between adjacent plates. When the electrons penetrate such a field from an aperture they are forced downward since the positive plate is above the aperture, and if the target bearing the phosphors is positive with respect to the average potentials of the plates 100, the electrons passing through the openings 20 will be reflected to the red, green or blue phosphor, depending upon the penetration. The degree of penetration is controllable in several ways. For example, in this arrangement, the potential difference between the alternate plates 100 may be varied. The mean potential, with respect to the target 16A may be varied. The velocity of the electron beam may be modulated. These suggested modes of operation will obtain color selection. If it is desired to vary the mean potential between the electron plates 100 and the target 16A, then alternate plates can be connected to the positive pole of the battery 108, the other plates being connected to the negative pole of the battery and the stepped waveform 48 may be applied to either pole of the battery.

Figure 4:
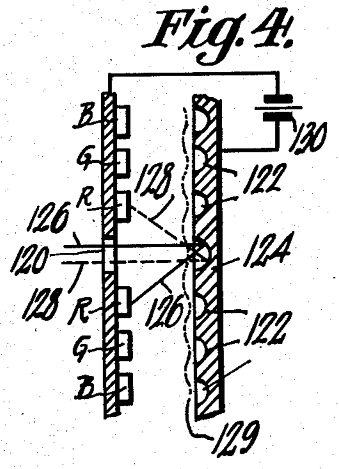
Figure 4 illustrates a section of an electron mirror in which the means for creating a transverse electrostatic field component are positioned at random with respect to the aperture.

Although the electron mirror shown in Figures 1 and 1A has been regularly shaped and has been positioned so that corresponding points in each repeated shape are opposite an aperture, irregularly shaped surfaces may be employed such as the one illustrated in Figure 4, provided that the size of their irregularities is fairly uniform and small with respect to the aperture. In the particular arrangement, the aperture 120 is circular and surrounded by annular rings of different color responsive phosphors R, G, and B, the red responsive phosphor R being the innermost ring and the green and blue phosphors, G and B, are the other rings. Opposite the aperture 120 is the electron mirror 124 which has a series of arbitrarily positioned depressions 122 which may be substantially in the form of a half-sphere, or a portion thereof. The electrons in the beam that approach the mirror 124 along the principal axis of any of the depressions 122 will be reflected back on themselves. However, those electrons which approach the electron mirror 124 parallel to, but displaced from, the normal axis of the depressions 122 will be reflected to either the red, green or blue phosphor, as indicated by the solid line 126 and the dotted line 128. The particular phosphor on which they will impinge depends upon the penetration of the beam of electrons into an electrostatic field, the equipotential lines of which are represented by the dotted lines 129. The electrostatic field is symmetrical about the control axis of each depression that is parallel to the principal axis of the cathode ray tube.

This field may be produced by connections to a suitable potential source, such, for example, as a battery 130. Those electrons that penetrate the furthest will be reflected to the blue phosphor ring and those that penetrate the least will be reflected to the red phosphor ring, and similarly, those that penetrate to a region in between will be reflected to a green phosphor ring. Penetration may be exercised in any of the forementioned ways. The diameter of the depressions 122 may vary, but it is essential that this diameter be small in comparison with the diameter of the aperture 120 if the depressions are to be positioned at random with respect to the aperture.

These embodiments of certain aspects of the invention merely illustrate how color selection may be achieved in a tube of this type by controlling the amount of penetration of electrons into an electrostatic field having components perpendicular to the direction of travel of the beam. For example, the electron mirror could have the shape indicated by Figure 5 in which a series of spike like projections 131 are directed from the electron mirror 132 towards the target 134. The equipotential lines of the electrostatic field will then be curved, as indicated by the dotted lines 136. Therefore, the electrostatic field has a component that is transverse to the direction of the beam.

Whereas special cathode ray tubes of the type discussed above may be employed in sequential systems, they are also useful in simultaneous systems in which the screen simultaneously emits light in accordance with the simultaneous variations of a plurality of component colors.

Figures 5, 6:
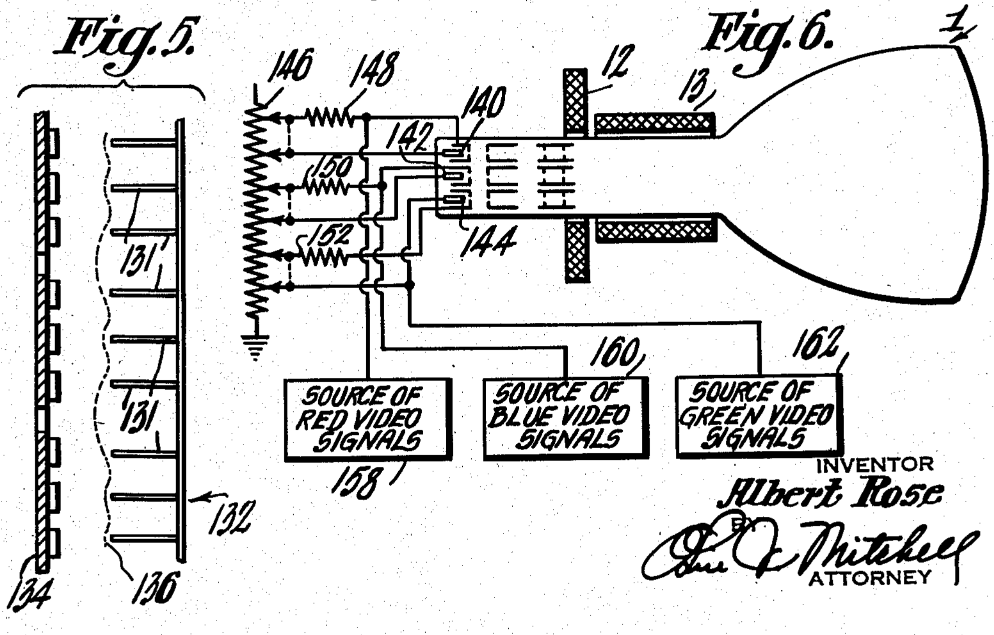
Figure 5 illustrates another form which the electron mirror may assume to develop an electrostatic field having a component that is transverse to the direction of approach of the beam.
Figure 6 illustrates a cathode ray tube which may be employed to reproduce colored images from simultaneous video signals.

The cathode ray tube shown in Figure 6 is capable of performing these functions and is essentially the same as that shown in Figure 1, with the exception that three separate electron gun structures, instead of one, are supplied so as to form three different beams of electrons. These guns are only shown schematically in the drawing but in the practical case should be physically mounted in close juxtaposition so that their projection beams will nearly coincide. In this way, common focusing and deflection coils may be used. Color separation is obtained by biasing the cathodes 140, 142 and 144 at different potentials on the potentiometer 146 as shown. The corresponding grids are connected to the potentiometer through load resistors 148, 150 and 152 respectively. The separation between the cathode contact and its corresponding grid contact at the potentiometer 146 is physically set at a fixed amount as shown by the dotted lines, and inasmuch as all these amounts are the same, the bias on each grid, with respect to its cathode, is the same. However, the cathodes 140, 144 and 142 all have different potentials and therefore the velocity of the beams projected by their respective gun structures will be sufficiently different so that they will follow separate trajectories after passing through the openings 154 in the target 156. Therefore, they will land on different phosphors in the same manner, as was explained in connection with Figure 1A. The resistance of the potentiometer 146 is extremely small and is especially small in comparison with the values of the resistances 148, 150 and 152. The reason for this is twofold. In the first place, the grid to ground impedance will be approximately the same for each gun, and in the second place, the cathode degeneration which is produced by the beam current flowing through that portion of the potentiometer will be reduced to a negligible amount. The sources of the different video signals 158, 160 and 162 are respectively tied to the grids associated with cathodes 140, 142 and 144. If it were desired to exactly equalize the grid to ground potentials the sizes of the resistors 148, 150 and 152 could be suitably altered. In a similar manner, if it were desired to equalize what little cathode degeneration is present, resistors of suitable size could be placed in series with each cathode lead.

Having thus described my invention, what is claimed is:

1. An apparatus for reproducing images in color comprising in combination a cathode ray tube having enclosed therein a target, groups of different color responsive phosphors mounted on said target, apertures in said target through which at least a portion of said electron beam can pass, means for reflecting the electrons that pass through said apertures so that they impinge on one of said phosphors, means for projecting a beam of electrons toward said target, and a grid adapted to control the intensity of the beam thus projected, a source of video signals that sequentially correspond to the intensities of different component colors, said source having an output terminal, said terminal being connected to said grid, a source of keying signals that are in synchronism with the sequential video signals, means for applying said keying signals to said electron reflecting means so that the electron beam strikes the desired phosphor on said target, means for focusing said beam on said target, and means adapted to cause said beam to scan said target in synchronism with the video signals.

2. Apparatus for reproducing images in color comprising in combination a source of video signals, a cathode ray tube having enclosed therein a target, said target having parallel apertures therein, and different color responsive phosphors mounted between said apertures, means for projecting a beam of electrons through said apertures, a source of waves having a different amplitude as the video signals represent different colors, means for reflecting the electrons that pass through said apertures back to a selected phosphor in response to said waves, and means for controlling the intensity of said beam in response to said video signals.

3. Apparatus for reproducing images in color comprising in combination a source of video signals that sequentially represent the intensities of the component colors, a cathode ray tube having enclosed therein a target, apertures within said target, parallel strips of different color responsive phosphor associated with each aperture, means for projecting a beam of electrons toward said target, means for controlling the intensity of said beam in accordance with said video signals, a plurality of electron lenses mounted beyond said target, each of said lenses being positioned directly opposite one of said apertures, each lens being adapted to move said electrons in a direction that is transverse to said strips of phosphor, means for establishing an electrostatic field between said target and said electron lenses that reflects the electrons passing through said apertures back to said target, and means for successively establishing the magnitude of the electrostatic field at different levels in synchronism with the sequential change of said video signals.

4. An apparatus such as described in claim 3 in which the electron lenses are comprised of current conducting material mounted at an acute angle with respect to said target.

5. An apparatus such as described in claim 3 in which the electron lenses are formed by current conducting members located between said apertures and means for applying different voltages to alternate members.

6. An apparatus for producing images in color in which the intensities of all component colors are simultaneously presented comprising in combination, a cathode ray tube having a target, means for projecting beams of electrons toward said target, means for individually controlling the intensity of each beam, a plurality of sources of video signals, each signal representing the intensity variations of a single color, means for applying each of these signals to one of said intensity controlling means, means for establishing the velocity of electrons in each beam at a different value, said target having a plurality of apertures through which at least a portion of the beams can pass, a plurality of groups of phosphors mounted on the far side of said target from said beam projecting means, and means for reflecting all of the portions of said beam that pass through said apertures back toward said phosphors, the electrons from each beam striking a predetermined phosphor.

7. An apparatus for producing images in color comprising in combination a cathode ray tube having enclosed therein a target, apertures in said target, a plurality of different color responsive phosphors associated with each aperture, means for projecting a beam of electrons toward said target, means beyond said target for reflecting the electrons that pass through said aperture with a given velocity to a predetermined phosphor and for reflecting electrons that pass through said aperture at a different velocity to another phosphor, means for controlling the intensity of said beam, a source of video signals that sequentially represent the intensity variations of a plurality of component colors, and means for varying the velocity of the electrons in the beam in synchronism with said video signals.

8. Color reproduction apparatus comprising in combination a cathode ray tube, a target in said tube having slits therein, lines of phosphors that produce different color light when struck by electrons, at least one phosphor line of each color being mounted between slits and on one side of said target, means for establishing an electrostratic field that is transverse to said slits and phosphor lines in a substantially parallel plane, said electrostatic field being of such polarity as to reflect the electrons passing through the slits back to said phosphor strips, means for projecting electrons toward said target from the side that is remote from said phosphor line, the particular phosphor line struck by the electrons that pass through said slits depending on the relationship between the velocity of said electrons and the strength of the transverse electrostatic field, and means for varying the relationship between the field and the velocity of said electrons so that the electrons may strike a desired strip.

9. A combination comprising a kinescope having an electron gun having a grid and a cathode and adapted to project a beam of electrons, a target having apertures therein mounted so as to intercept said beam, groups of different color responsive parallel phosphor strips mounted on the side of said target that is remote from said gun, and an electron mirror mounted parallel to and spaced from said target and on the side that is remote from said electron gun, means for establishing the potential of said target at a greater positive potential than said electron mirror so that the electrons passing through said apertures are reflected back to one of said phosphor strips, means for establishing the grid and cathode of said gun at a lower mean potential than said target, and means for successively changing the potential of said grid and cathode by the same amounts so as to change successively the velocity of the beam in a corresponding manner and thus cause it to strike the different phosphors in succession.

ALBERT ROSE.

REFERENCES CITED

The following references are of record in the file of this patent:

UNITED STATES PATENTS

| Number | Name | Date |
|---|---|---|
| 1,988,605 | Michelssen | Jan. 22, 1935 |
| 2,125,599 | Batchelor | Aug. 2, 1938 |
| 2,264,709 | Nicoll | Dec. 2, 1941 |
| 2,307,188 | Bedford | Jan. 5, 1943 |
| 2,446,249 | Schroeder | Aug. 3, 1948 |
| 2,446,440 | Swedlund | Aug. 3, 1948 |
| 2,446,791 | Schroeder | Aug. 10, 1948 |
| 2,480,848 | Geer | Sept. 6, 1949 |
| 2,481,839 | Goldsmith | Sept. 13, 1949 |

FOREIGN PATENTS

| Number | Country | Date |
|---|---|---|
| 866,065 | France | Mar. 31, 1941 |